United States Patent
Tsai

(10) Patent No.: US 6,923,466 B2
(45) Date of Patent: Aug. 2, 2005

(54) COLLAPSIBLE HANDCART CAPABLE OF EXTENDING THE AREA OF CARRIER BY OPERATING HANDLE

(76) Inventor: James Tsai, No. 103, Ta-Ming 1 Rd., Tung Pao Village, Tan Tzu Hsian, Taichung Hsien (TW), 427

( * ) Notice: Subject to any disclaimer, the term of this patent is extended or adjusted under 35 U.S.C. 154(b) by 160 days.

(21) Appl. No.: 10/320,437

(22) Filed: Dec. 17, 2002

(65) Prior Publication Data
US 2004/0113396 A1 Jun. 17, 2004

(51) Int. Cl.$^7$ .............................. B62B 1/00; B62B 7/02; B62D 21/14; B62D 33/08; B60P 1/04
(52) U.S. Cl. .................... 280/646; 280/652; 280/47.28; 280/47.29; 280/38; 280/40; 280/42; 280/655; D34/26; 414/490
(58) Field of Search ................................. 280/652, 646, 280/645, 641, 655, 651, 638, 639, 654, 40, 38, 47.27, 47.24, 47.29, 47.26, 42, 47.17, 47.315, 47.131, 47.18, 47.19, 43.1, 43.11, 43.12, 43.16, 43.17, 43.24, 29.11, 39, 35, 47.28, 79.11; 414/490; D34/26

(56) References Cited

U.S. PATENT DOCUMENTS

| | | | | | |
|---|---|---|---|---|---|
| 4,281,849 A | * | 8/1981 | Chandick et al. | ........... | 280/655 |
| 4,418,776 A | * | 12/1983 | Weirick | ...................... | 180/19.3 |
| 4,684,141 A | * | 8/1987 | Nunokawa | .................... | 280/40 |
| 5,024,458 A | * | 6/1991 | Kazmark et al. | ........... | 280/645 |
| 5,074,577 A | * | 12/1991 | Kim | ............................ | 280/646 |
| 5,290,049 A | * | 3/1994 | Crisp et al. | ................... | 280/30 |
| 5,348,325 A | * | 9/1994 | Abrams | ....................... | 280/40 |
| 5,526,894 A | * | 6/1996 | Wang | ........................ | 180/65.1 |
| 5,857,684 A | * | 1/1999 | Liao et al. | .................... | 280/40 |
| 6,102,433 A | * | 8/2000 | Stevens | ...................... | 280/646 |
| 6,447,002 B1 | * | 9/2002 | Fang | .......................... | 280/646 |
| 6,561,527 B2 | * | 5/2003 | Spadino | ................... | 280/47.26 |
| 6,685,214 B2 | * | 2/2004 | Gregory | ...................... | 280/652 |

* cited by examiner

Primary Examiner—Christopher P. Ellis
Assistant Examiner—G B Klebe
(74) Attorney, Agent, or Firm—Bacon & Thomas, PLLC

(57) ABSTRACT

A collapsible handcart comprises a handle bar, a support carrier having a main carrier and two movable carriers, two sets of linkages and a trigger. The handle bar has an end thereof pivoted on the main carrier to be turned between an extended position, at which the handle bar is turned away from the main carrier, and a collapsed position, at which the handle bar is turned towards the main support carrier. The linkages are connected movable carriers with the main carrier such that the movable carriers can be driven to move between an extended position, at which the movable carriers are away from the main carrier, and a collapsed position, at which the movable carrier close to the main carrier. The trigger has an end thereof pivoted on the handle bar whereby turn the handle bar will drive the trigger to move. The trigger can drive the movable carriers to move such that the movable carriers will be driven to the extended position when turns the handle bar to the extended position and will be driven to the collapsed position when turns the handle bar to the collapsed position.

19 Claims, 5 Drawing Sheets

US 6,923,466 B2

COLLAPSIBLE HANDCART CAPABLE OF EXTENDING THE AREA OF CARRIER BY OPERATING HANDLE

FIELD OF THE INVENTION

The present invention relates to a collapsible handcart, and more particularly to a collapsible handcart, which can change the carrier's area, when operates the handle.

BACKGROUND OF THE INVENTION

Recently, the handcarts are made into a size as smaller as possible so that they are portable and easy to be stored. But such handcart must have smaller carrier, which means they only can support goods with smaller size thereon. They cannot stably support larger-size goods on a smaller-area carrier.

There were a lot of inventions presented to meet demands of the handcart having a smaller size and supporting larger-size goods. One of which is Chandick et al. (U.S. Pat. No. 4,281,849), Chandick taught a luggage carrier having two extension frames pivoted on the opposite sizes of a support frame respectively. The extension frames can be extended to extend the area of the support frame when the luggage carrier needs to support a larger-size good thereon and can be folded to reduce the size thereof when the luggage carrier is collapsed.

Another one invention was an earlier invention of the present inventor. A handcart of the invention provided two extension frames slidably disposed to a support member respectively at opposite sides thereof. The extension frames can be pulled out from the support member to enlarge the area of supporting goods and can be pushed into the support member to reduce the size when the handcart is collapsed.

It is obviously to see that the handcarts needed to operate by manual to extend or collapse the extension frames so that there will be more steps to extend and collapse the conventional handcarts.

The primary object of the present invention is to provide a collapsible handcart, which can extend and reduce the area of a support carrier when extend and collapse the handcart.

According to the object of the present invention, a collapsible handcart comprises a handle bar, a support carrier having a main carrier and two movable carriers and a trigger. The handle bar has an end thereof pivoted on the main carrier to be turned between an extended position, at which the handle bar is turned away from the main carrier, and a collapsed position, at which the handle bar is turned towards the main support carrier. The movable carriers is movably disposed at the lateral sizes of the main carrier to be driven to move between an extended position, at which the movable carriers are away from the main carrier, and a collapsed position, at which the movable carrier close to the main carrier. The trigger has an end thereof pivoted on the handle bar whereby turn the handle bar will drive the trigger to move. The trigger can drive the movable carriers to move such that the movable carriers will be driven to the extended position when turns the handle bar to the extended position and will be driven to the collapsed position when turns the handle bar to the collapsed position.

BRIEF DESCRIPTION OF THE INVENTION

DETAIL DESCRIPTION OF THE INVENTION

Figure 1:
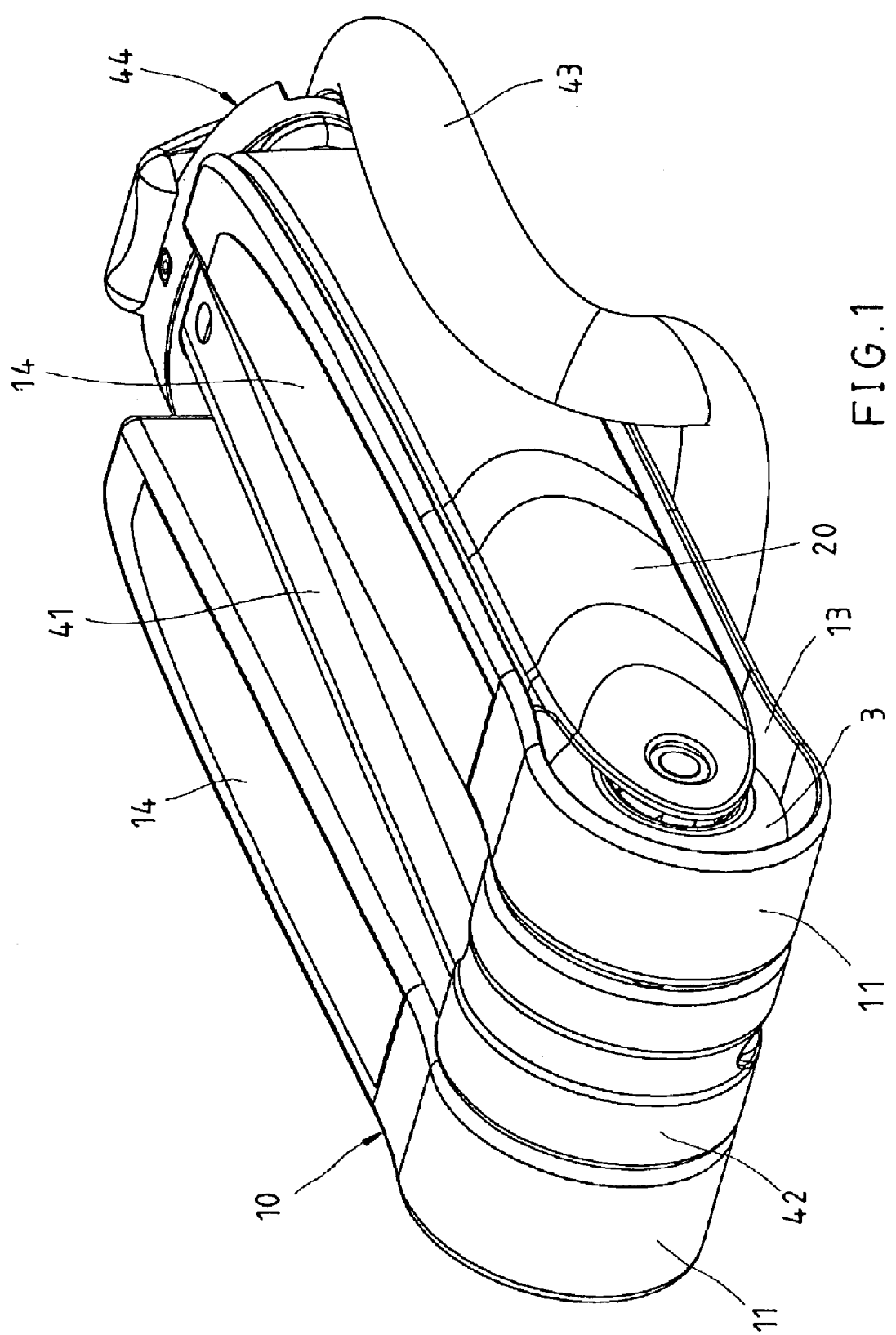
FIG. 1 is a respective view of a first preferred embodiment of the present invention under collapsed status.
Figure 2:
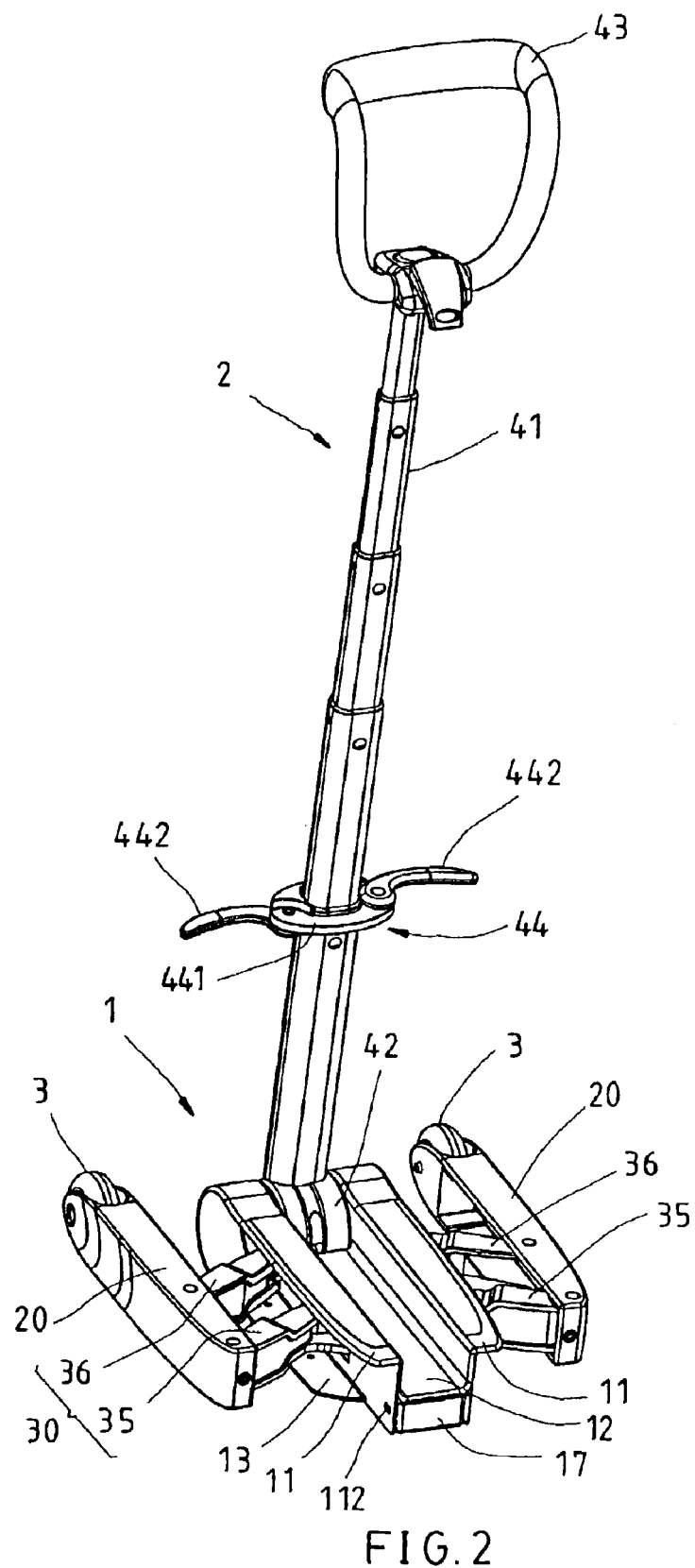
FIG. 2 is a respective view of the first preferred embodiment of the present invention under extended status.
Figure 3:
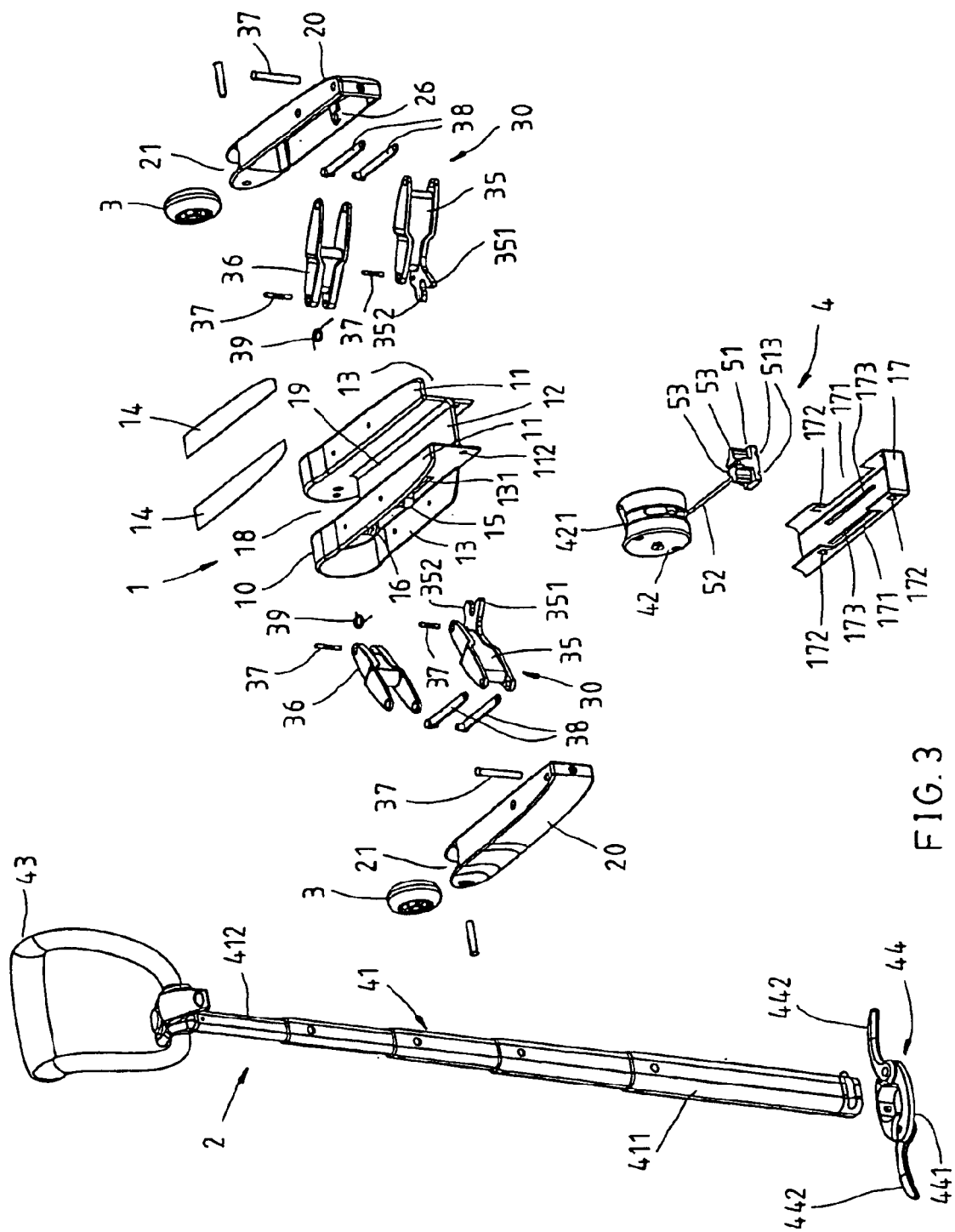
FIG. 3 is an exploded view of the first preferred embodiment of the present invention.

Please refer to the FIGS. from FIG. 1 to FIG. 3, the first preferred embodiment of the present invention provides a collapsible handcart mainly comprising a support carrier 1, a handle bar 2, two wheels 3 and a trigger 4 wherein The support carrier 1 is constructed from a main carrier 10, two movable carriers 20 and two sets of linkages 30.

The main carrier 10 has two parallel side members 11 and a board 12 coupled with the side members 11. Each side member 11 has a chamber 13 at exterior side thereof, an elongated through hole 131 at bottom side of the chamber 13 and two pivot seats 15 and 16 projected from the bottom side of the chamber 13. Two rubber pieces 14 are attached on the topsides of the side members 11 respectively. A box 17, which is opening at topside and rear side, has gaps 171 and hookers 172 at lateral walls respectively and has two parallel rails 173 at interior side of bottom wall. The box 17 is disposed at the main carrier 10 at between the side members 11 and under the board 12 with the hookers 172 locked with openings 112 on the interior walls of the side members 11. The gaps 171 of the box 17 correspond to the through holes 131 of the side members 11 respectively to communicate the chambers 13 with the interior space of the box 17. The main carrier 10 has a jointer seat 18 at the rear side of the board 12 and between the side members 11 and a slot 19 at between the side members 11 and above the board 12.

Each movable carrier 20 has a wheel seat 21 at rear side thereof to pivot the wheels 3 therein and a chamber 23 at interior side thereof in which has two pivot seats 25 and 26. The movable carriers 20 can be totally received in the chambers 13 of the main carrier 10 respectively.

Each set of the linkages 30 has a H-shaped first linkage 35 and a H-shaped second linkage 36. The first and the second linkages 35 and 36 have ends thereof pivoted on the main carrier 10 and have the other ends thereof pivoted on the movable carriers 20 respectively with pins 37 respectively running through the pivot seats 15, 16, 25 and 26 on the main carrier 10 and the movable carriers 20 and the linkages 35 and 36. Therefore, the movable carriers 20 are movably connected with the main carrier 10 to be driven to move between a collapsed position, at which the movable carriers 20 are totally received in the chambers 13 of the main carrier 10, and an extended position, at which the movable carriers 20 move away from the main carrier 10 at a predetermined distance. The first linkages 35 have Y-shaped heads at the ends pivoted on the main carrier 10 extruded into the box 17 via the through holes 131. Each head has a first driven portion 351 and a second driven portion 352. Each set of the first and the second linkages 35 and 36, the movable carrier 20 and the main carrier 10 construct a four-linkages mechanism. Four third linkages 38 pivot their ends on the first and second linkages 35 and 36 respectively at the ends of which pivoted on the movable carriers 20. The third linkages 38 are to enhance the strength of the structure. Two torsional springs 39 are respectively disposed at the pivot portions of the second linkages 36 and the main carrier 10 to provide a biasing force to force the movable carriers 20 moving to the extended position.

The handle bar 2 has a retractable tubes set 41, a jointer 42, a grip 43 and a holder device 44. The jointer 42 has a hole 411 for receiving a bottom tube 411 of the retractable tubes set 41 and the grip 43 is pivoted on a top tube 412 of the retractable tubes set 41. The retractable tubes set 41 dispose control elements (not shown) therein so that a user can operate a button 45 on the grip 42 to extend and collapse the retractable tubes set 41. The holder device 44 has a seat 441 fastened to the retractable tubes set 41 and two extendable arms 442 pivoted on the lateral sides of the seat 411 respectively. The jointer 42 is received in the jointer seat 18 of the main carrier 10 with a pin 421 running through the side members 11 and the jointer 42 such that the handle bar 2 is pivoted on the support carrier 1 to be turned between a collapsed position (seeing FIG. 1), at which the handle bar 2 is turned towards the support carrier 1 with the retractable tubes set 41 (under the collapsed status) received in the slot 19 of the main carrier 10 and the grip 43 can be turned to rest on the bottom side (the side opposite from the slot 18), and an extended position (see FIG. 2), at which the handle bar 2 is turned outwards the support carrier 1 about 90 degrees.

The trigger 4 has a driving head 51 and a linkage 52. The driving head 51 is received in the box 17 of the support carrier 1 with two parallel rail 513 at bottom side thereof engaged with the rails 173 of the box 17 such that the driving head 51 is slidable. The linkage 52 has an end thereof pivoted on the jointer 42 and the other end thereof pivoted on the driving head 51 such that turning the handle bar 2 can drive the driving head 51 to slide. The driving head 51 has two driving portions 53 respectively located at between the first driven portions 351 and the second driven portions 352 of the first linkages 35.

Figure 4:
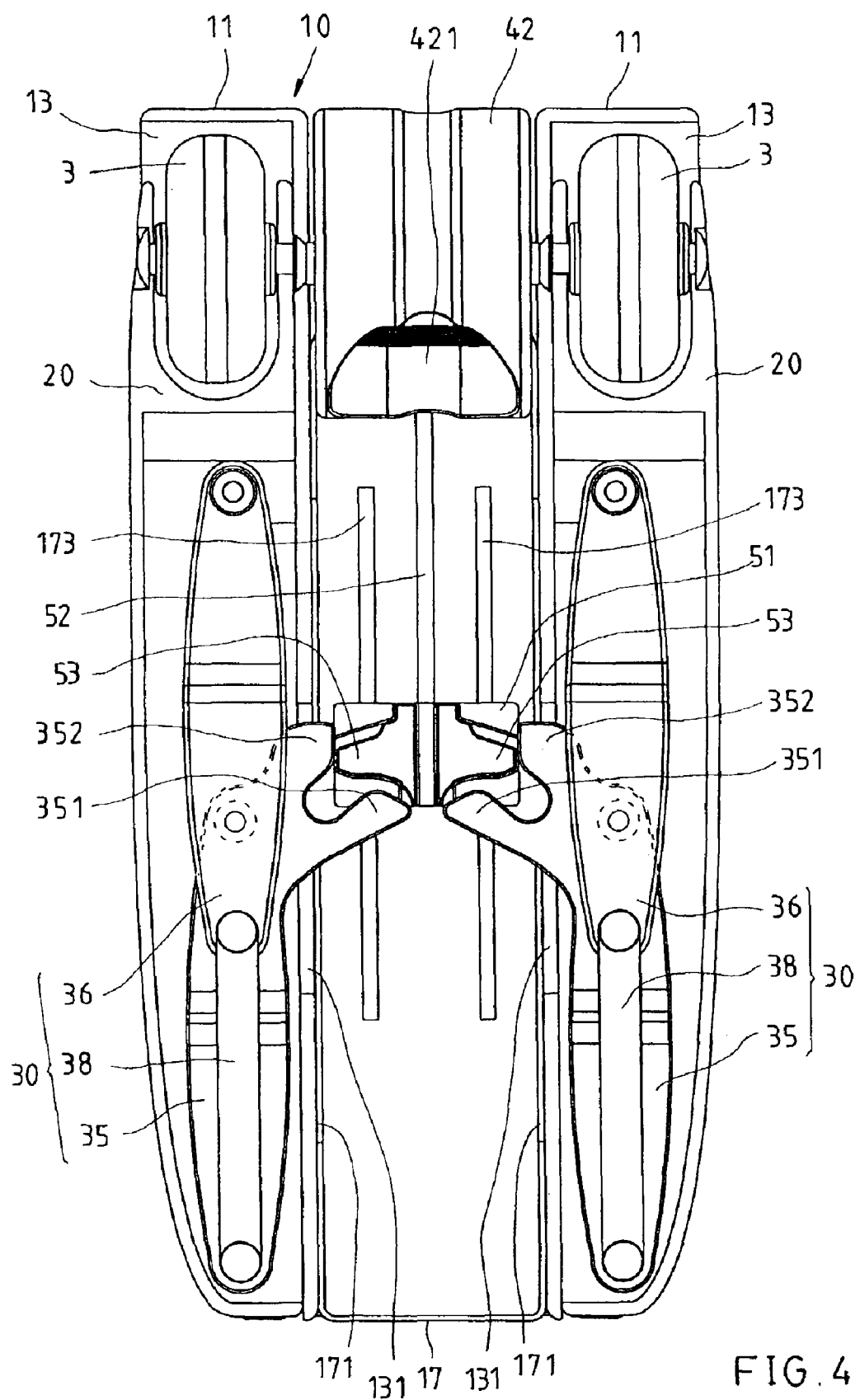
FIG. 4 is a sectional view, showing how a trigger drives movable carriers to the collapsed position.

Please refer to FIG. 4, when the handle bar 2 has been turned to the collapsed position, the driving head 51 of the trigger 4 will be driven to slide rearward via the linkage 52. At this time, the driving portions 511 of the driving head 51 will be in touch with the first driven portions 351 of the first linkages 35 to drive the first linkages 35 to move. Therefore, the movable carriers 20 will be driven to move to the collapsed position.

Figure 5:
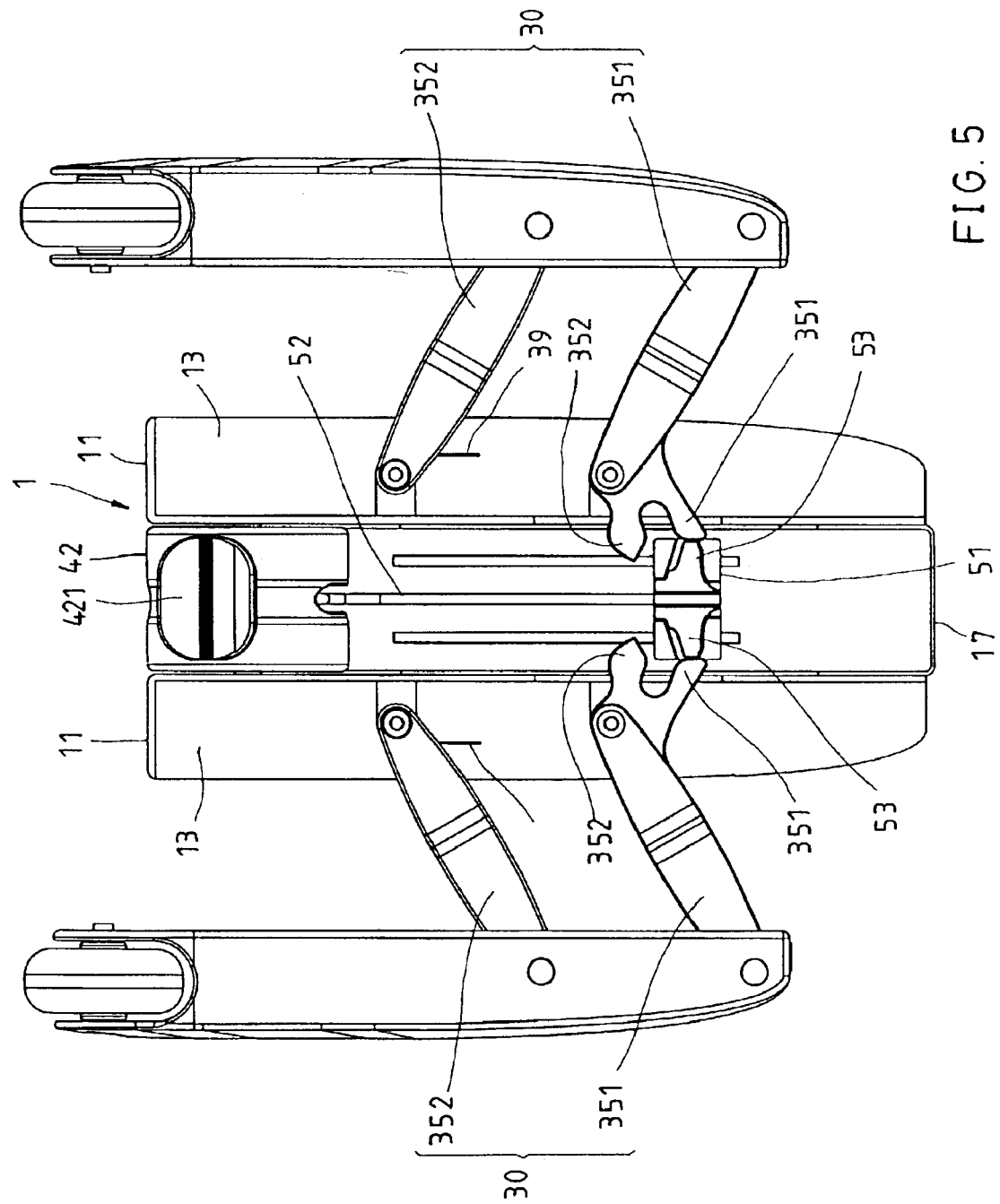
FIG. 5 is a sectional view, showing how the trigger drives the movable carriers to the extended position.

On the contrary, please refer to FIG. 5, when the handle bar 2 has been turned to the extended position, the driving head 51 of the trigger 4 will be driven to slide frontward via the linkage 52. At this time, the driving portions 511 of the driving head 51 will be in touch with the second driven portions 352 of the first linkages 35 to drive the first linkage 35 to move. Therefore, the movable carriers 20 will be driven to move to the extended position.

In the collapsed mode of the collapsible handcart of the present invention, the movable carriers 20 are totally received in the chambers 13 of the main carrier 10, the retractable tubes set 41 (under the collapsed status) is received in the slot 19 of the main carrier 10 and the grip 43 is turned to rest on the bottom side of the main carrier 10. The handcart of the present invention is collapsed into a size as smaller as possible. A normal person can hold handcart of the present invention in one hand.

If user need to use the handcart of the present invention, he/she just needs to turn the handle bar 2 upwards to the extended position and the movable carrier 20 will be driven to move to the extended position automatically. The support area of the support carrier 1 is extended in the extended mode of the handcart of the present invention for supporting goods with larger size thereon. The rubber pieces 14 can provide goods put on the support carrier 1 a friction to prevent them from slipping off. The extendable arms 442 of the holder device 44 can be turned outwardly to rest against the goods such that the goods can be stably stand on the support carrier 1.

The advantages of the collapsible handcart of the present invention are:

1. User only needs to operate the handle bar 2 for extending and collapsing the support carrier 1, which superior to a conventional handcart needs to extend and collapse extension members by manual.

2. In the collapsed mode of the collapsible handcart of the present invention, it has a smaller size for a person can hold it by one hand. Therefore, the handcart of the present invention has a superior capacity of portability.

3. The wheels 3 are also received in the chambers 13 of the main carrier 10 when the collapsible handcart of the present invention is collapsed. It can prevent the collapsible handcart from slipping when it is collapsed.

4. The collapsible handcart of the present invention is constructed from fewer elements so that it costs less in manufacture.

What is claimed is:

1. A collapsible handcart, comprising:

a support carrier having a main carrier and two movable carriers, wherein said movable carriers are movably coupled on lateral sides of said main carrier respectively to be driven for movement between a collapsed position, at which said movable carriers are close to said main carrier, and an extended position, at which said movable carriers are away from said main carrier by a predetermined distance so as to extend a support area of the support carrier for supporting goods with a larger size than can be supported by the main carrier;

a handle bar having a grip at an end thereof and pivoting the other end thereof on said main carrier of said support carrier to be turned between a collapsed position, at which said handle bar is turned inwardly to said main carrier, and an extended position, at which said handle bar is turned outwardly from said main carrier by a predetermined angle;

two wheels pivoted on said support carrier;

a movable trigger provided at said main carrier of said support carrier and having an end thereof pivoted on said handle bar such that turning said handle bar will drive said trigger to move and said trigger can activate said movable carriers to move;

whereby said movable carriers will be driven to move to the collapsed position via said trigger when said handle bar is turned to the collapsed position and said movable carriers will be driven to move to the extended position via said trigger when said handle bar is turned to the extended position; and two sets of linkages that are used to connect said movable carriers to said main carrier, and each set of said linkages has a first linkage and a second linkage with their ends pivoted on said main carrier and said movable carriers respectively.

2. The collapsible handcart as defined in claim 1, wherein said main carrier of said support carrier has two chambers at the lateral sides thereof for respectively receiving said movable carriers therein when they are at the collapsed position.

3. The collapsible handcart as defined in claim 1, wherein said main carrier of said support carrier has a slot at a topside thereof for receiving said handle bar therein when it is at collapsed position.

4. The collapsible handcart as defined in claim 1, wherein said support carrier is provided with at least a frictional piece thereon.

5. The collapsible handcart as defined in claim 1, wherein wheels are pivoted on said movable carriers of said support carrier.

6. The collapsible handcart as defined in claim 1, wherein said first and said second linkages are H-shaped bar elements.

7. The collapsible handcart as defined in claim 1, further comprising a third linkage pivoting its opposite ends on said first and said second linkages respectively.

8. The collapsible handcart as defined in claim 1, further comprising a spring exerted on one of said linkages for forcing said linkages to drive said movable carriers to the extended position.

9. The collapsible handcart as defined in claim 1, wherein said trigger has a driving head and a linkage, wherein said driving head is slidably installed on said main carrier of said support carrier and said linkage has an end thereof pivoted on said driving head and the other end thereof pivoted on said handle bar.

10. The collapsible handcart as defined in claim 1, wherein said handle bar further comprises a jointer at the end opposite from said grip to be pivoted on said main carrier.

11. The collapsible handcart as defined in claim 1, wherein said handle bar is provided with a holder device, which has a seat secured to said handle bar and two extendable arms pivoted on said seat for turning outwardly and inwardly.

12. The collapsible handcart as defined in claim 1, wherein said grip is pivoted on said handle bar such that when said handle bar is turned to the collapsed position, said handle bar rests on a side of said main carrier and said grip rests on the opposite side of said main carrier.

13. The collapsible handcart as defined in claim 1, wherein said trigger is situated in said main carrier.

14. The collapsible handcart as defined in claim 1, wherein said main carrier of said support carrier has two side members and a board fastening its opposite sides to said side members respectively.

15. The collapsible handcart as defined in claim 14, further comprising a box disposed between said side members and under said board with hookers on said box locking with openings on said side members.

16. The collapsible handcart as defined in claim 1, wherein said main carrier of said support carrier is fastened with a box for receiving the trigger therein.

17. The collapsible handcart as defined in claim 16, wherein said box is provided with at least a rail to be engaged with said trigger such that said trigger can move along said rail.

18. The collapsible handcart as defined in claim 1, wherein said first linkage is provided with a first driven portion and a second driven portion to be activated by said trigger for driving said first linkage, said second linkage and said movable carrier to move.

19. The collapsible handcart as defined in claim 18, wherein said trigger has a driving head and said driving head has a driving portion, wherein said driving portion is located between said first and said second driven portions of said first linkage such that the movement of said driving head can drive said first linkage to turn.

* * * * *